United States Patent [19]

Fujii et al.

[11] Patent Number: 5,735,919
[45] Date of Patent: Apr. 7, 1998

[54] EXHAUST GAS PROCESSING SYSTEM

[75] Inventors: Seiichi Fujii, Tokyo; Hiroshi Nagano, 6-19-8 Shikahama, Adachi-ku, Tokyo 123, both of Japan

[73] Assignees: Suntec System Co., Ltd.; Hiroshi Nagano, both of Tokyo, Japan

[21] Appl. No.: 766,124

[22] Filed: Dec. 16, 1996

[30] Foreign Application Priority Data

Dec. 14, 1995 [JP] Japan ........................... 7-326114

[51] Int. Cl.$^6$ ........................... B04B 15/02
[52] U.S. Cl. ........................... 55/331; 55/337; 55/348; 55/395; 55/429; 55/463
[58] Field of Search ........................... 55/331, 337, 338, 55/339, 340, 348, 395, 429, 432, 433, 440, 447, 463, 459.1, DIG. 14; 110/233

[56] References Cited

U.S. PATENT DOCUMENTS

| | | | |
|---|---|---|---|
| 1,856,685 | 5/1932 | Anderson | 55/338 |
| 4,512,759 | 4/1985 | Alink et al. | 55/DIG. 14 |
| 4,734,030 | 3/1988 | Fenaux | 55/DIG. 14 |
| 4,878,440 | 11/1989 | Tratz et al. | 110/233 |
| 4,940,213 | 7/1990 | Ohmine et al. | |
| 5,123,945 | 6/1992 | Lin | 55/459.1 |
| 5,308,368 | 5/1994 | Duijn | 55/459.1 |

FOREIGN PATENT DOCUMENTS

| | | | |
|---|---|---|---|
| 697313 | 11/1964 | Canada | 55/459.1 |
| 1043961 | 12/1978 | Canada | 55/462 |
| 166 846 | 1/1986 | European Pat. Off. | |
| 495 393 | 7/1992 | European Pat. Off. | |
| 300201-5 | 6/1971 | U.S.S.R. | 55/338 |
| 1064986 | 1/1984 | U.S.S.R. | 55/462 |
| 1809772A3 | 4/1993 | U.S.S.R. | 55/459.1 |
| 2138318A | 10/1984 | United Kingdom | 55/462 |

*Primary Examiner*—Jay H. Woo
*Assistant Examiner*—Minh-Chau T. Pham
*Attorney, Agent, or Firm*—Flynn, Thiel, Boutell & Tanis, P.C.

[57] ABSTRACT

An exhaust gas processing system is provided with a particle separating apparatus capable of separating and removing particles contained in an exhaust gas from the exhaust gas disposed between a front and a back exhaust pipes forming the exhaust gas discharge line. The particle separating apparatus includes a gas vessel defining a gas chamber for receiving the exhaust gas containing particles and discharged through a rear end portion of the front exhaust pipe, and an exhaust gas guide member disposed in the gas chamber and having guide walls defining an internal space and provided with openings through which the internal space communicates with the gas chamber. The guide walls are formed so as to guide the exhaust gas discharged into the gas chamber through the rear end portion of the front exhaust pipe so that the exhaust gas flows in vertical, whirling currents in the gas chamber. A particle receiving unit of a particle container is connected to a particle discharge unit of the particle separating apparatus. The gas contained in the particle container is replaced with an inert gas by a gas replacing apparatus before separating the particle container from the particle separating apparatus.

15 Claims, 10 Drawing Sheets

F I G. 4
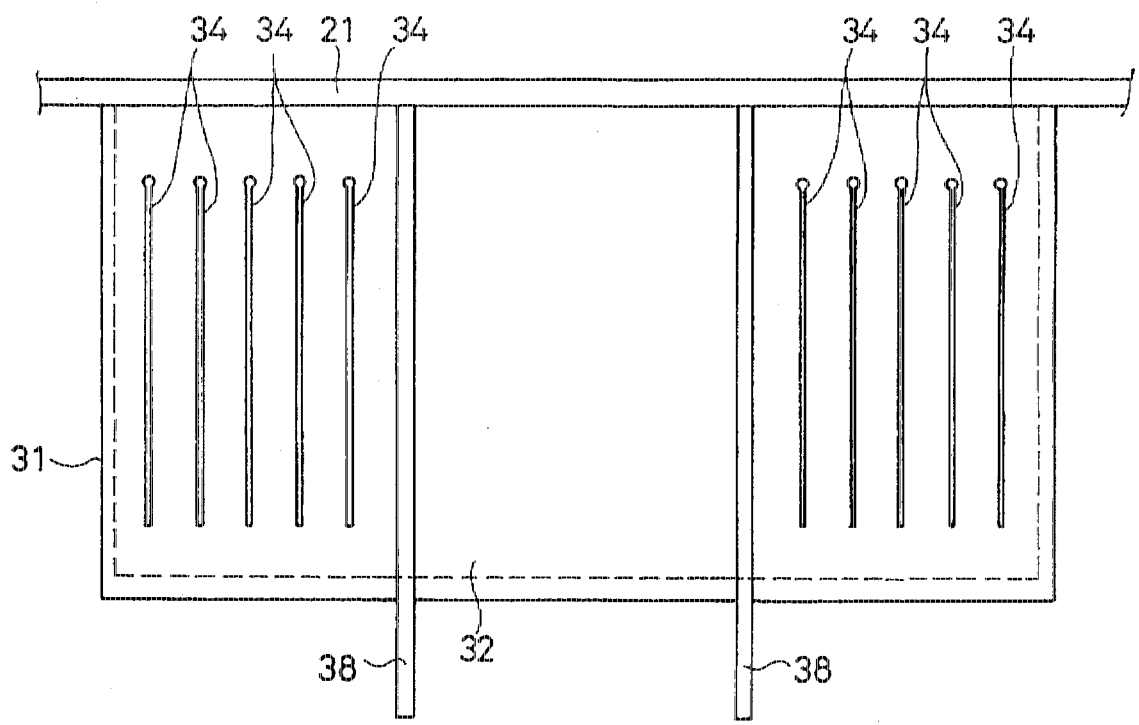

FIG. 8(A)　　FIG. 8(B)
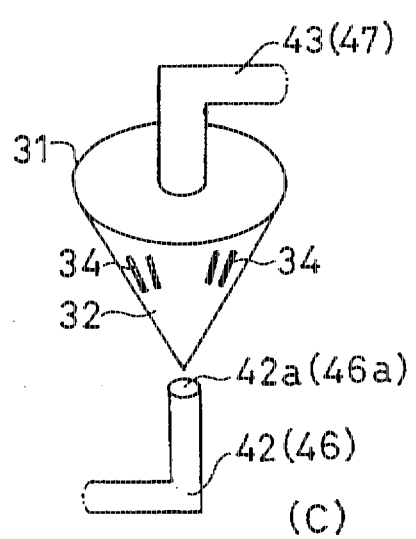
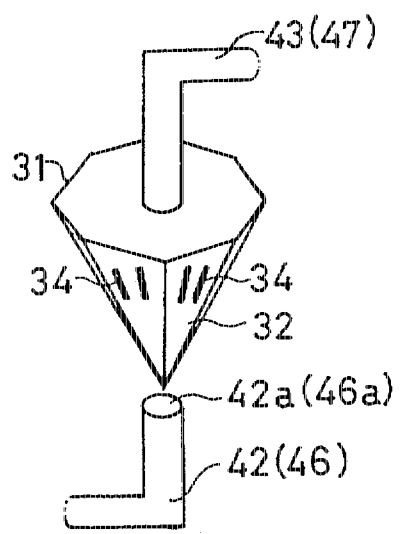
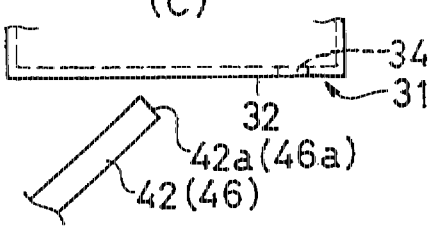
(C)

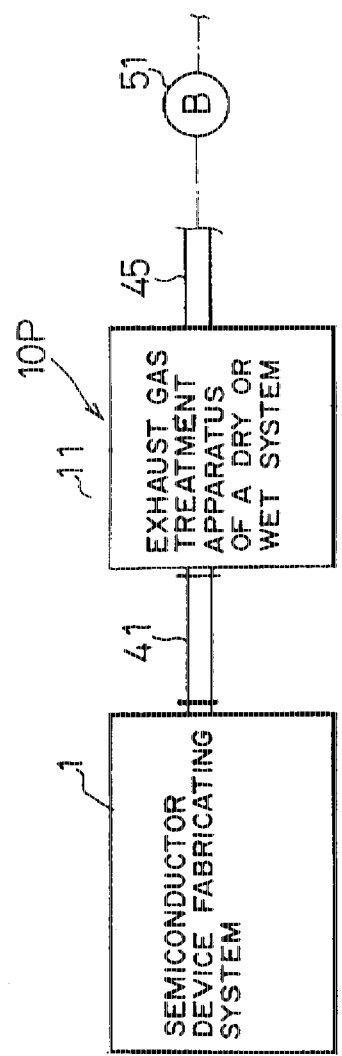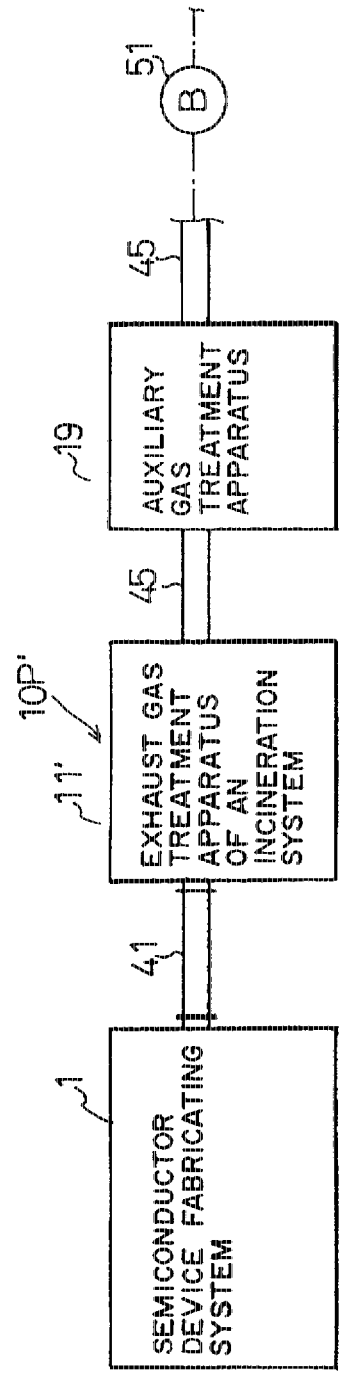

EXHAUST GAS PROCESSING SYSTEM

BACKGROUND OF THE INVENTION

1. Field of the Invention

The present invention relates to an exhaust gas processing system provided with an exhaust gas treatment means capable of making an exhaust gas discharged from a semiconductor device fabricating system harmless.

2. Description of the Related Art

Referring to FIG. 10(A), reaction gases, such as silane gas ($SiH_4$), arsine gas ($AsH_3$) and phosphine gas ($PH_3$), used in, for example, carrying out a CVD process by a semiconductor device fabricating system are discharged from the semiconductor device fabricating system and sent to an exhaust gas processing system 10P. The exhaust gas processing system 10P makes the exhaust gas harmless.

The exhaust gas processing system 10P has an exhaust gas treatment apparatus 11 connected by an exhaust line 41 to the semiconductor device fabricating system 1, and a blower 51, for example, i.e., a suction means, connected by a suction pipe 45 to the exhaust gas treatment apparatus 11. When the blower 51 operates, the exhaust gas is sucked from the semiconductor device fabricating system 1 into the exhaust gas treatment apparatus 11 to make the exhaust gas harmless by the exhaust gas treatment apparatus 11.

More specifically, the exhaust gas treatment apparatus 11 treats the exhaust gas so that the harmful gas concentration of the exhaust gas is reduced below a permissible concentration, such as TLV, an environmental quality standard. The exhaust gas treatment apparatus 11 is a dry system that uses an absorbent, a wet system that uses water shower or the like, or an incineration system that incinerates the exhaust gas. Usually the exhaust gas treatment apparatus of an incineration system is employed in treating an exhaust gas containing harmful gasses which cannot satisfactorily be removed by the exhaust gas treatment apparatus of a dry system or a wet system. An exhaust gas treatment apparatus of an incineration system is used for reducing the arsine ($AsH_3$) gas concentration of the exhaust gas to an environmental quality standard of 0.05 ppm or below and for reducing the phosphine ($PH_3$) gas concentration to an environmental quality standard of 0.3 ppm or below.

As shown in FIG. 10(B), an exhaust gas processing system 10P' provided with an exhaust gas treatment apparatus 11' incineration system can be provided with an auxiliary gas treatment apparatus 19 such as a scrubber for removing gases such as HF and $HC_1$ gases that are produced when the exhaust gas is burnt in the exhaust gas treatment apparatus 11' of an incineration system.

Sometimes, oxygen ($O_2$) reacts with silane ($SiH_4$) in the semiconductor device fabricating system 1 shown in FIG. 10(A) to produce $SiO_2$ powder, and the exhaust gas that flows through the exhaust line 41 into the exhaust gas treatment apparatus 11 contains the $SiO_2$ powder.

The $SiO_2$ powder accumulates in the exhaust line 41 and obstructs the smooth flow of the exhaust gas through the exhaust line 41 into the exhaust gas treatment apparatus 11. Consequently the harmful gas removing efficiency of the exhaust gas treatment apparatus 11 is reduced significantly.

When the exhaust gas processing system 10P' is employed, silane ($SiH_4$) is oxidized in the exhaust gas treatment apparatus 11' of an incineration system and $SiO_2$ powder is produced. The $SiO_2$ powder is liable to accumulate in the suction pipe 45 to deteriorate the performance of the auxiliary gas treatment apparatus 19 greatly.

When the $SiO_2$ powder accumulates excessively in the exhaust line 41 (the suction pipe 45), the operation of the semiconductor device fabricating system 1 and the exhaust gas processing system 10P (10P') is stopped, and the exhaust line 41 (the suction pipe 45) and the exhaust gas treatment apparatus 11 (11') must be disassembled and cleaned, which reduces the productivity of the semiconductor device fabricating system 1 greatly.

The exhaust gas processing system 10P provided with the exhaust gas treatment apparatus 11 of a dry system or a wet system may be provided with a filter, not shown, in the exhaust line 41, and the exhaust gas processing system 10P' provided with the exhaust gas treatment apparatus 11' of an incineration system may be provided with a filter, not shown, in the suction pipe 45.

However, the filter becomes blocked with powder in a short time and hence the semiconductor device fabricating system 1 needs to be stopped frequently to change the filter.

In the exhaust gas processing system 10P, there is the possibility that an explosive exhaust gas retained in the powder deposited by processing the exhaust gas reacts with oxygen in the atmosphere and causes an accidental explosion when disposing of the powder deposit. Therefore, it is necessary to establish techniques for the safe disposal of the powder deposit.

SUMMARY OF THE INVENTION

Accordingly, it is a first object of the present invention to provide an exhaust gas processing system capable of smoothly cleaning an exhaust gas discharged from a semiconductor device fabricating system or an exhaust gas discharged from an exhaust gas treatment apparatus of an incineration system by separating powder from the exhaust gas without stopping the operation of the semiconductor device fabricating system for an extended period of operation. A second object of the present invention is to provide an exhaust gas processing system capable of safely disposing of powder produced by a harmful gas separating process.

According to a first aspect of the present invention, an exhaust gas processing system comprises an exhaust gas treatment means of a dry system or a wet system connected to a semiconductor device fabricating system by an exhaust gas discharge line, and a suction means connected to the exhaust gas treatment means by a suction line to suck an exhaust gas from the semiconductor device fabricating system into the exhaust gas treatment means, wherein the exhaust gas discharge line is formed by a front exhaust pipe and a back exhaust pipe, a particle separating apparatus capable of separating and removing particles contained in the exhaust gas from the exhaust gas is disposed between the front and the back exhaust pipes, the particle separating apparatus having a gas vessel defining a gas chamber for containing an exhaust gas containing particles and discharged through a rear end of the front exhaust pipe, and an exhaust gas guide member disposed in the gas chamber and having guide walls defining an internal space and provided with openings by means of which the internal space communicates with the gas chamber, and the guide walls of the exhaust gas guide member are formed so as to guide the exhaust gas discharged into the gas chamber through the rear end of the front exhaust pipe while the suction means is in operation so that the exhaust gas flows in vertical, whirling currents in the gas chamber.

When the suction means is driven for operation to suck the exhaust gas through the openings of the guide member, the exhaust gas discharged from the semiconductor device fabricating system is sucked through the front exhaust pipe into the gas chamber. The exhaust gas often contains particles, such as $SiO_2$ particles, produced in the semiconductor device fabricating system. The exhaust gas is guided by the guide walls of the guide member so as to flow in vertical, whirling currents.

If the exhaust gas contains particles, the particles are unable to whirl together with the exhaust gas by inertia, separate from the vertical, whirling currents and fall down. As the exhaust gas flows in vertical, whirling currents, the particles collide with each other and cohere to form aggregates of particles of a mass greater than that of the individual particles. Since the inertia (centrifugal force) of those aggregates of particles of large masses is large, the aggregates of particles fall quickly in the initial stage of whirling in the gas chamber.

Thus, the particles contained in the exhaust gas are separated forcibly from the exhaust gas as the exhaust gas flows in vertical, whirling currents in the gas chamber and deposit in the bottom portion of the gas chamber, and a gas produced by separating and removing the particles from the exhaust gas is sucked through the openings of the guide member into the exhaust gas treatment means.

Thus, the exhaust gas discharge line, more specifically, the back exhaust pipe and the exhaust gas treatment means will not be blocked with the particles. Since the particle separating apparatus is constructed so as not to be blocked up with the particles, the particles contained in the exhaust gas can be separated and removed effectively from the exhaust gas for an extended period of continuous operation without stopping the semiconductor device fabricating system.

According to a second aspect of the present invention, an exhaust gas processing system comprises an exhaust gas treatment means of an incineration system connected to a semiconductor device fabricating system by an exhaust gas discharge line, and a suction means connected to the exhaust gas treatment means by a suction line to suck an exhaust gas from the semiconductor device fabricating system into the exhaust gas treatment means, wherein the suction line is formed by a front suction pipe and a back suction pipe, a particle separating apparatus capable of separating and removing particles contained in the exhaust gas from the exhaust gas is disposed between the front and the back suction pipes, the particle separating apparatus has a gas vessel defining a gas chamber for containing an exhaust gas containing particles and discharged through a rear end of the front suction pipe, and an exhaust gas guide member disposed in the gas chamber, and having guide walls defining an internal space and provided with openings by which the internal space communicates with the gas chamber, and the guide walls of the exhaust gas guide member are formed so as to guide the exhaust gas discharged into the gas chamber through the rear end of the front suction pipe while the suction means is in operation so that the exhaust gas flows in vertical, whirling currents in the gas chamber.

The exhaust gas processing apparatus according to the second aspect of the present invention, similarly to that according to the first aspect of the present invention, is capable of surely separating and removing particles, such as $SiO_2$ particles produced by the exhaust gas treatment means of an incineration system from the exhaust gas for an extended period of continuous operation without stopping the semiconductor device fabricating system.

According to a third aspect of the present invention, the exhaust gas processing system may further comprise a particle container having a particle receiving unit detachably connected by a connecting pipe to a particle discharge unit of the particle separating apparatus, valves disposed at the particle discharge unit of the particle separating apparatus and the particle receiving unit of the particle container, respectively, and a gas replacing means for replacing the gas contained in the connecting pipe and the particle container with an inert gas to separate the particle container sealing the inert gas therein from the particle separating apparatus for disposal.

The valves are opened to deliver the particles collected in the gas chamber of the particle separating apparatus to the particle container. When the particles collected and stored in the particle container are disposed of, the valve disposed in the particle receiving unit of the particle container is kept open and the valve disposed in the particle discharge unit of the particle separating apparatus is closed, the gas replacing means is operated to replace the gas contained in the particle container with an inert gas, such as $N_2$ gas, the valve disposed in the particle receiving unit of the particle container is closed, and then the particle container is disconnected from the particle separating apparatus.

Since the valves are closed to seal the particle container during operations for replacing the gas contained in the particle container with the inert gas and for disconnecting the particle container from the particle separating apparatus, the particles may not leak from the particle container and the particle separating apparatus. Since the inert gas is contained in the particle container disconnected from the particle separating apparatus, accidental explosion or the like will not occur even if an explosive exhaust gas is held in the particles contained in the particle container, so that the particle container can safely be disposed of.

BRIEF DESCRIPTION OF THE DRAWINGS

The above and other objects, features and advantages of the present invention will become more apparent from the following description taken in connection with the accompanying drawings, in which:

FIG. 4 is similarly a cross sectional view for explanation of the outlets defined on the surface of the guide member;

FIGS. 8(a) and 8(B) are similarly views of modifications of the guide member;

FIGS. 10(A) and 10(B) are similarly explanatory views of a structure of conventional exhaust gas processing systems.

DETAILED DESCRIPTION OF THE PREFERRED EMBODIMENTS

First Embodiment

Figure 1:
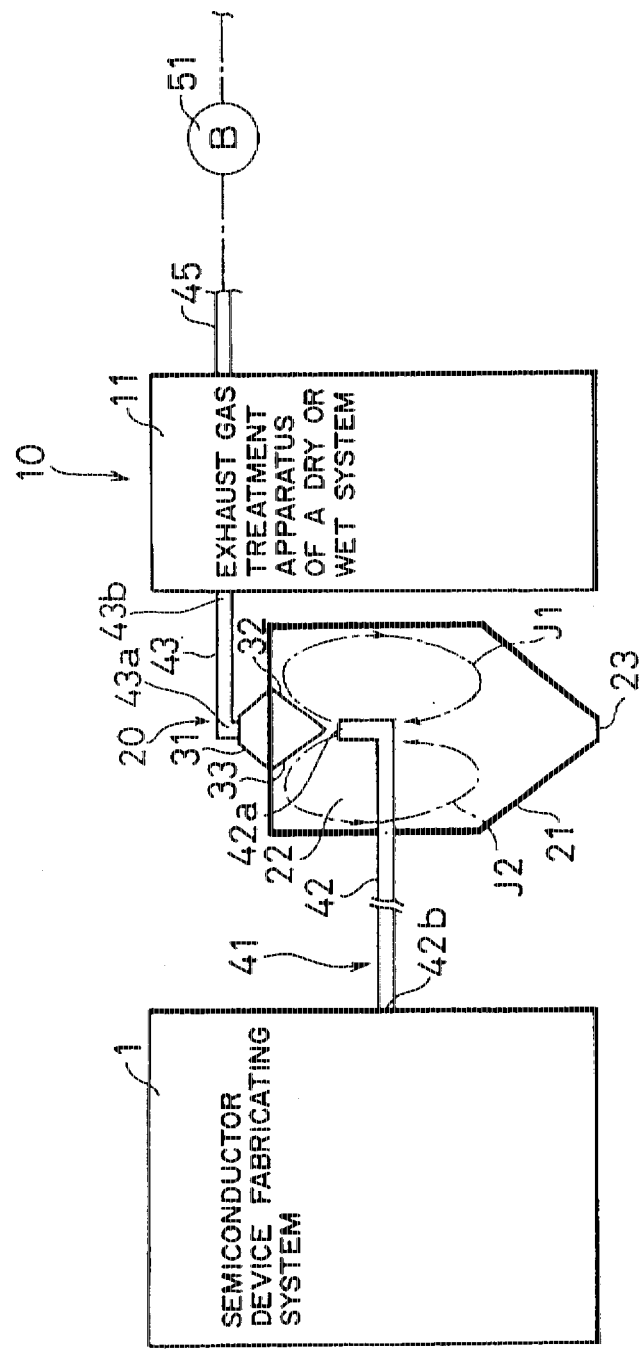
FIG. 1 is a view describing a first embodiment according to the present invention.

An exhaust gas processing system 10 in a first embodiment according to the present invention will be described with reference to FIGS. 1 to 4, in which parts like or corresponding to those of the conventional exhaust gas processing systems shown in FIG. 10 are designated by the same reference characters and the description thereof will be omitted.

The exhaust gas processing system 10 in the first embodiment shown in FIGS. 1 to 4 is similar in basic configuration to the conventional exhaust gas processing systems previously described with reference to FIG. 10. The exhaust gas processing system is provided with a particle separating apparatus 20 disposed between a front exhaust pipe 42 and a back exhaust pipe 43 forming an exhaust gas discharge line 41. The particle separating apparatus 20 makes an exhaust gas flow in whirling currents therein to separate particles, such as $SiO_2$ particles, contained in the exhaust gas.

As shown in FIG. 1, the front exhaust pipe 42 has one end portion 42a bent vertically up, and the other end portion 42b connected to a semiconductor device fabricating system 1. The back exhaust pipe 43 has one end portion 43a connected to a guide member 31, described later, disposed in the particle separating apparatus 20, and the other end portion 43b connected to an exhaust gas treatment apparatus 11 of a dry or wet system.

The particle separating apparatus 20 has a gas vessel 21 defining a gas chamber 22, a guide member 31, and a suction device 51.

Figure 3:
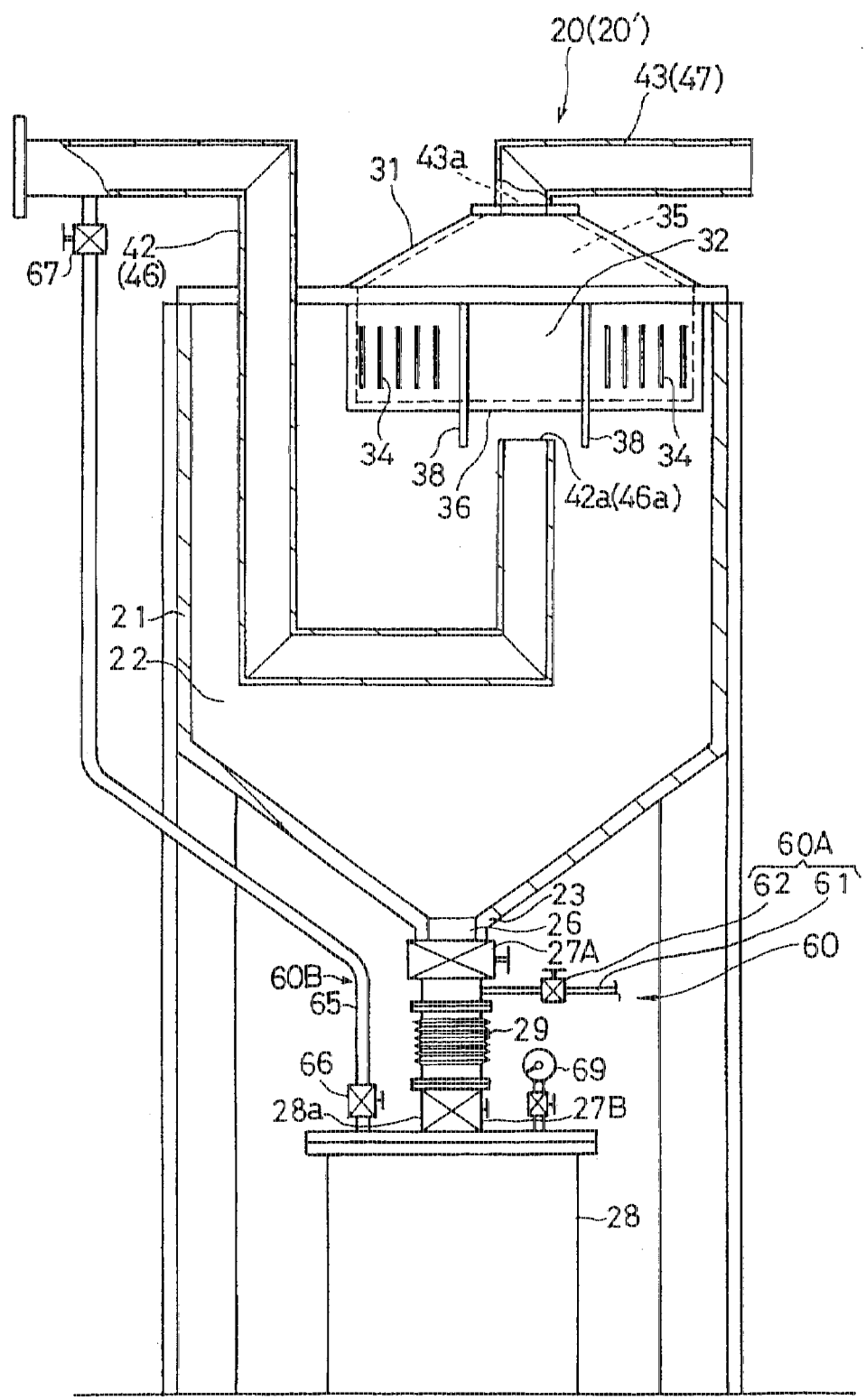
FIG. 3 is similarly a cross sectional side view for explanation of the structure of the particle separating apparatus.
Figure 9:
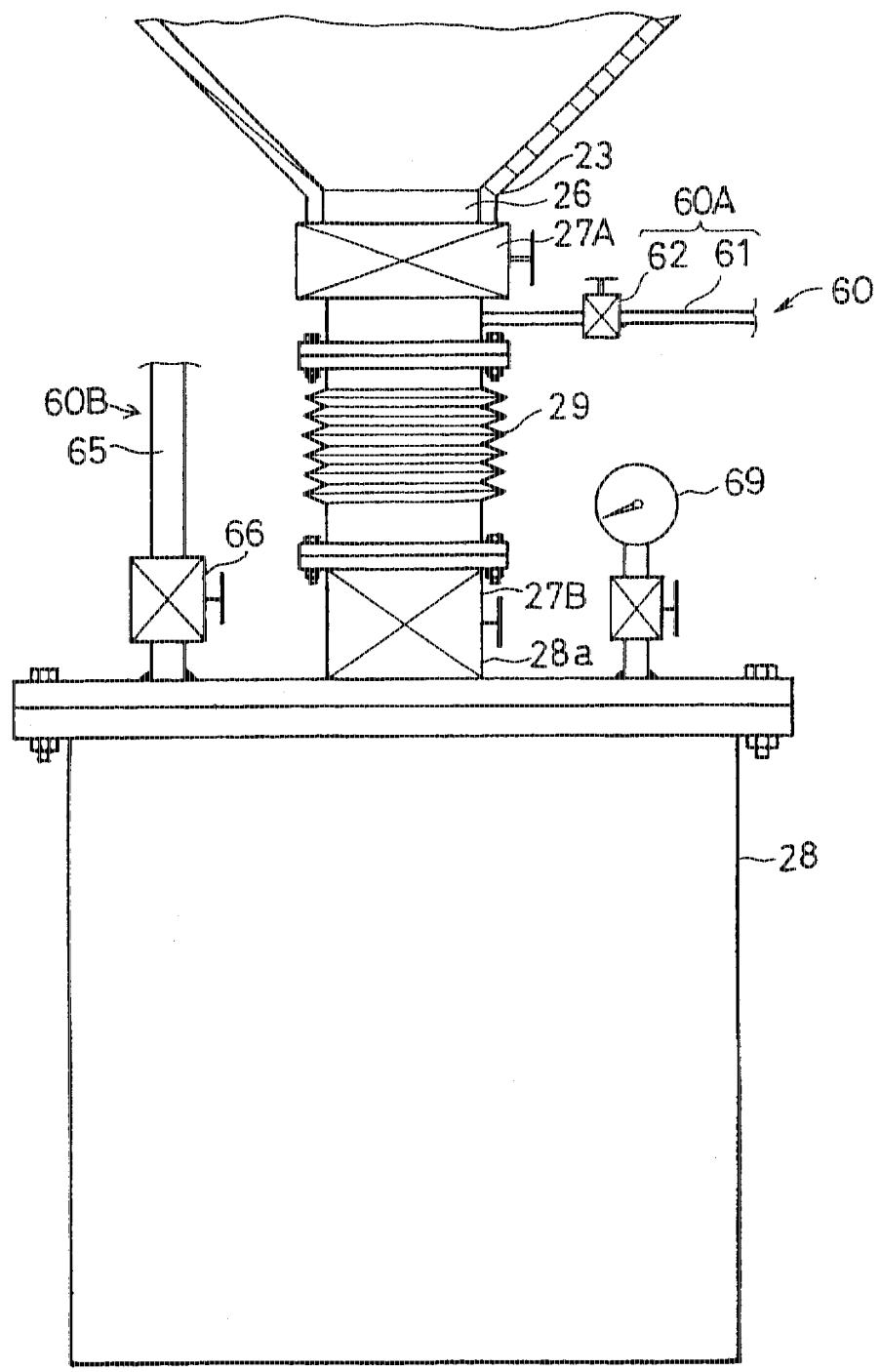
FIG. 9 is similarly a view of a connecting mechanism connecting a particle container to a gas vessel.

The exhaust gas is discharged through the end portion 42a of the front exhaust pipe 42 into the gas chamber 22 of the gas vessel 21. As shown in FIGS. 3 and 9, a particle discharge unit 26 is attached to the bottom wall 23 of the gas vessel 21. Particles, such as $SiO_2$ particles, collected in the gas chamber 22 are discharged through the particle discharge unit 26.

A particle receiving unit 28a of a particle container 28 is connected detachably by a connecting pipe 29, such as a flexible pipe, to the particle discharge unit 26. The particle receiving unit 28a of the particle container 28 may directly be connected to the particle discharge unit 26.

The particle discharge unit 26 of the gas vessel 21 is provided with a valve 27A, and the particle receiving unit 28a of the particle container 28 is provided with a valve 27B.

The exhaust gas processing system 10 is provided with a gas replacing apparatus 60 for replacing the gas contained in the particle container 28 with an inert gas, such as $N_2$ gas.

The gas replacing apparatus 60 comprises an inert gas supply unit 60A for supplying the inert gas into the particle container 28, and a return line 60B for returning the gas contained in the particle container 28 into the front exhaust pipe 42.

The inert gas supply unit 60A has an inert gas supply pipe 61 having one end connected to the particle discharge unit 26 at a position below the valve 27A, and the other end connected to an inert gas source, not shown, and a valve 62 disposed in the inert gas supply pipe 61. The gas replacing apparatus 60 supplies an inert gas ($N_2$ gas) through the flexible connecting pipe 29 and the like into the particle container 28.

The return line 60B has a return pipe 65 having a lower end connected to the particle container 28, and an upper end connected to the front exhaust pipe 42, and valves 66 and 67 disposed halfway in the return pipe 65. The gas is returned from the particle container 28 to the front exhaust pipe 42. Indicated at 69 is a pressure gage for indicating the pressure in the particle container 28.

Figure 2:
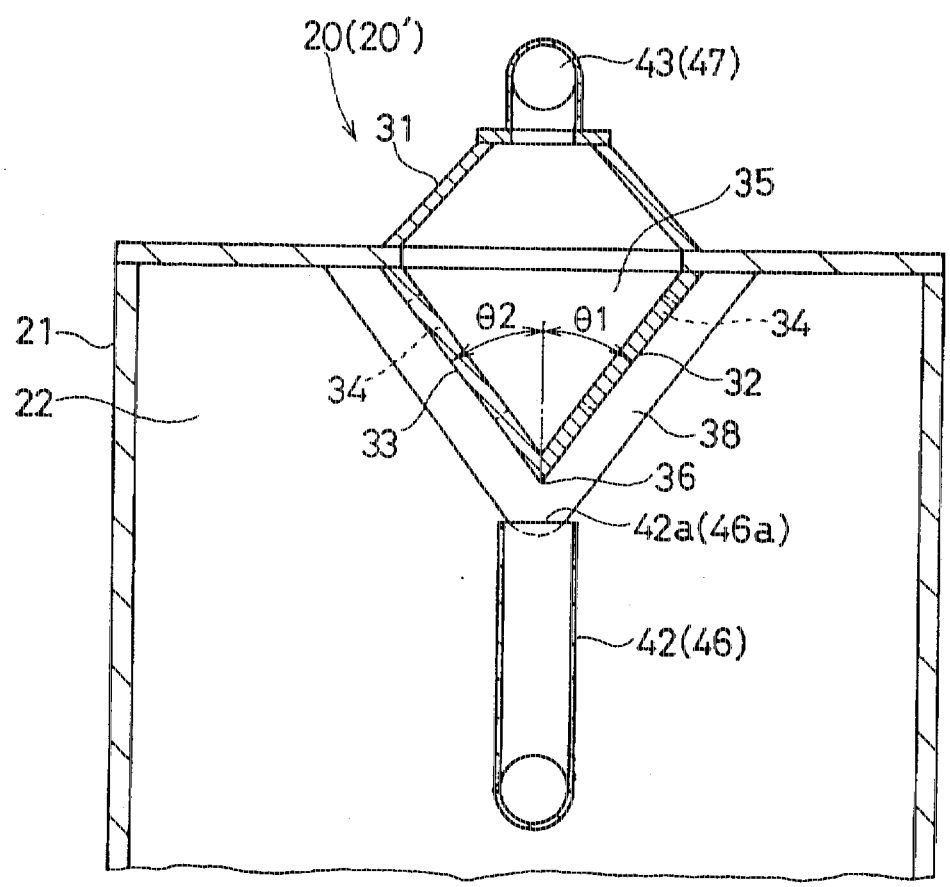
FIG. 2 is similarly a view for explanation of positional relation between a guide member and one end of the front exhaust pipe.

Referring to FIG. 2, the guide member 31 is disposed in an upper portion of the gas chamber 22 defined by the gas vessel 21, and has a pair of bottom walls 32 and 33 joined along a longitudinal edge 36 so as to form a bottom portion of a V-shaped cross section, and is provided with openings 34 by means of which the internal space 35 of the guide member 31 communicates with the gas chamber 22. The guide member 31 is provided with ribs 38 for reinforcement as in FIGS. 2 to 4. The internal space 35 is connected to the exhaust gas treatment apparatus 11 by the back exhaust pipe 43. The guide member 31 is disposed with the edge 36 of the V-shaped lower portion thereof extended in parallel to the open end of the end portion 42a of the front exhaust pipe 42, and with the guide surfaces of the bottom walls 32 and 33 inclined at equal inclinations $\theta1$ and $\theta2$ (for example, $\theta1=\theta2=37°$) to a vertical plane including the longitudinal axis of the end portion 42a of the front exhaust pipe 42.

When the suction device 51 operates, an exhaust gas is blown through the end portion 42a of the front exhaust pipe 42 against the guide surfaces of the bottom walls 32 and 33 of the guide member 31. Consequently, the exhaust gas is deflected by the guide surfaces of the bottom walls 32 and 33 of the guide member 31 so as to flow in vertical, whirling currents in the gas chamber 22.

As shown in FIG. 4, the openings 34 of the guide member 31 are slits formed at predetermined intervals in portions of the bottom walls 32 and 33 excluding the respective middle portions of the bottom walls 32 and 33. These openings 34 may be through holes.

When the suction device 51 is driven for operation, the gas is sucked from the gas chamber 22 through the openings 34 of the guide member 31, the back exhaust pipe 43, the exhaust gas treatment apparatus 11 and the suction pipe 45.

The operation of the exhaust gas processing system 10 will be described hereinafter. The suction device 51 is driven to suck the gas from the gas chamber 22 of the particle separating apparatus 20 through the openings 34 of the guide member 31. Consequently the exhaust gas used by the semiconductor device fabricating system 1, such as $SiO_4$ gas or the like is discharged through the end portion 42a of the front exhaust pipe 42 into the gas chamber 22 after being sucked through the other end portion 42b of the front exhaust pipe 42. Sometimes, the exhaust gas contains particles, such as $SiO_2$ particles, produced in the semiconductor device fabricating system 1.

The exhaust gas thus discharged into the gas chamber 22 is deflected by the guide surfaces of the bottom walls 32 and 33 of the guide member 31 so as to flow in vertical, whirling currents J1 and J2 in the gas chamber 22.

Figure 5:
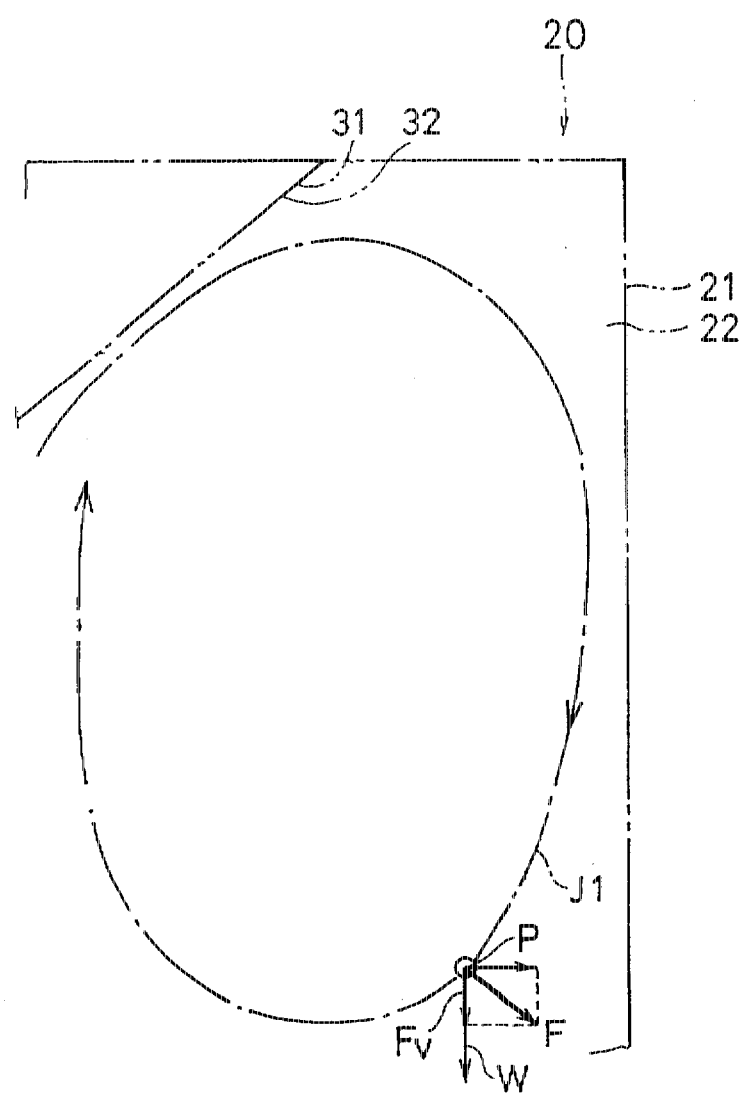
FIG. 5 is similarly a view of assistance in explaining a principle of particles falling by the whirling gas currents.

If the exhaust gas contains particles P, a centrifugal force F acts on each of the particles P as the particles P move along the vertical whirling currents J1 and J2 as shown in FIG. 5. In lower portions of the vertical, whirling currents J1 and J2, the vertical component $F_v$ of the centrifugal force F increases, and each of the particles P is unable to flow together with the exhaust gas because both the increased vertical component $F_v$ of the centrifugal force F and its own weight W tend to move the particles P downward and, eventually, the particles P are separated from the vertical whirling currents J1 and J2 of the exhaust gas and collects in the bottom of the gas chamber 22.

The particles P collide against each other and some particles P cohere to form aggregates of the particles P as the particles P flow in the vertical, whirling currents J1 and J2. Since the aggregates of the particles P have masses greater than those of the individual particles P and high centrifugal forces act on the aggregates of the particles P, the separation of the particles P from the exhaust gas is accelerated.

Thus, the particles P separate from the exhaust gas as the exhaust gas flows in the vertical, whirling currents J1 and J2 in the gas chamber 22 and deposit in the bottom of the gas chamber 22, and the exhaust gas not containing the particles P flows through the openings 34 of the guide member 31 into the exhaust gas treatment apparatus 11.

Although upper portions of the vertical, whirling currents of the exhaust gas flowing along the guide surfaces of the bottom walls 32 and 33 of the guide member 31 are able to flow through the openings 34 of the guide member 31, particles P of masses greater than that of the exhaust gas are unable to move across the vertical, whirling currents J1 and J2. Therefore, even if light particles not separated from the exhaust gas is moved near to the openings 34 by the vertical, whirling currents J1 and J2, the particles are unable to flow through the openings 34.

The valves 27A and 27B are opened to discharge the particles P deposited and collected in the gas chamber 22 through the flexible connecting pipe 29 into the particle container 28.

When the particles P collected in the particle container 28 are disposed of, the valve 27A is closed, the valve 27B is kept open, and then the gas contained in the particle container 28 and the flexible connecting pipe 29 is replaced with an inert gas ($N_2$ gas) by the gas replacing apparatus 60.

When the gas is replaced with the inert gas, the valves 66 and 67 are opened, and then the inert gas supply unit 60A is actuated to supply the inert gas ($N_2$ gas) into the particle container 28 and the flexible connecting pipe 29. Consequently the gas contained in the particle container 28 and the flexible connecting pipe 29 is forced to flow through the valve 66, the pipe 65 and the valve 67 of the return line 60B into the front exhaust pipe 42 by the inert gas. Thus, the gas contained in the particle container 28 and the flexible connecting pipe 29 is replaced with the inert gas ($N_2$ gas).

Then, the particle receiving unit 28a of the particle container 28 is disconnected from the flexible connecting pipe 29, and the valve 66 is closed and disconnected from the return pipe 65.

Since the inert gas ($N_2$ gas) is sealed in the particle container 28, which is from the particle separating apparatus 20, accidental explosions or the like will not occur even if an explosive exhaust gas is held by the particles contained in the particle container 28, and hence the particles can safely be disposed of.

The particle container 28 containing the particles is emptied by the following procedure. The particle container 28 separated from the particle separating apparatus 20 is transported to a predetermined place for waste disposal. An air supply jig provided with a flow regulating valve, not shown, is connected to the valve 27B of the particle receiving unit 28a of the particle container 28. The air supply jig provided with the flow regulating valve is capable of supplying air at a low flow rate and adjusting the oxygen concentration of air.

Subsequently, air is supplied at a low flow rate into the particle container 28 and the temperature of the interior of the particle container 28 monitored. If the temperature of the interior of the particle container 28 tends to rise, the temperature is monitored until the temperature stops rising, and the flow rate of air is regulated or the oxygen concentration of air is reduced. If the temperature of the interior of the particle container 28 does not rise at all or if the temperature rises first, and then drops and stabilizes at a low temperature, air is supplied continuously to fill up the particle container 28 with air.

After the particle container 28 has been filled up with air, the air supply jig is removed from the particle container 28, and then the particles P are removed from the particle container 28. Thus the particles P can safely be disposed of.

As mentioned above, in the exhaust gas processing system in this embodiment, the particle separating apparatus 20 is disposed between the front exhaust pipe 42 and the back exhaust pipe 43 of the exhaust gas discharge line 41, and the vertical, whirling currents J1 and J2 of the exhaust gas are produced in the particle separating apparatus 20 to separate the particles P from the exhaust gas, the exhaust gas discharge line 41, more specifically, the back exhaust pipe 43 of the exhaust gas discharge line 41, and the exhaust gas treatment apparatus 11 are not blocked with the particles P, and the particle separating apparatus 20 is designed so as not to be blocked with the particles. Therefore, particles contained in the exhaust gas can surely be separated from the exhaust gas and the exhaust gas can efficiently be treated to remove harmful gasses from the exhaust gas for an extended period of operating time without interrupting the operation of the semiconductor device fabricating system 1.

Since the guide member 31 has the pair of bottom walls 32 and 33 forming guide surfaces, the two vertical, whirling currents J1 and J2 can be produced in the gas chamber 22 and, thereby, time necessary for exhaust gas treatment can further be reduced.

Since the gas contained in the particle container 28 that may explode is replaced with the inert gas by the gas replacing apparatus 60, the particle container 28 can be separated from the particle separating apparatus 20 without taking the risk of accidental explosion or the like of the particle container 28. The particles contained in the particle container 28 can safely be removed from the particle container 28 by using the air supply jig provided with the flow regulating valve after the particle container 28 is separated from the particle separating apparatus 20.

Second Embodiment

Figure 6:
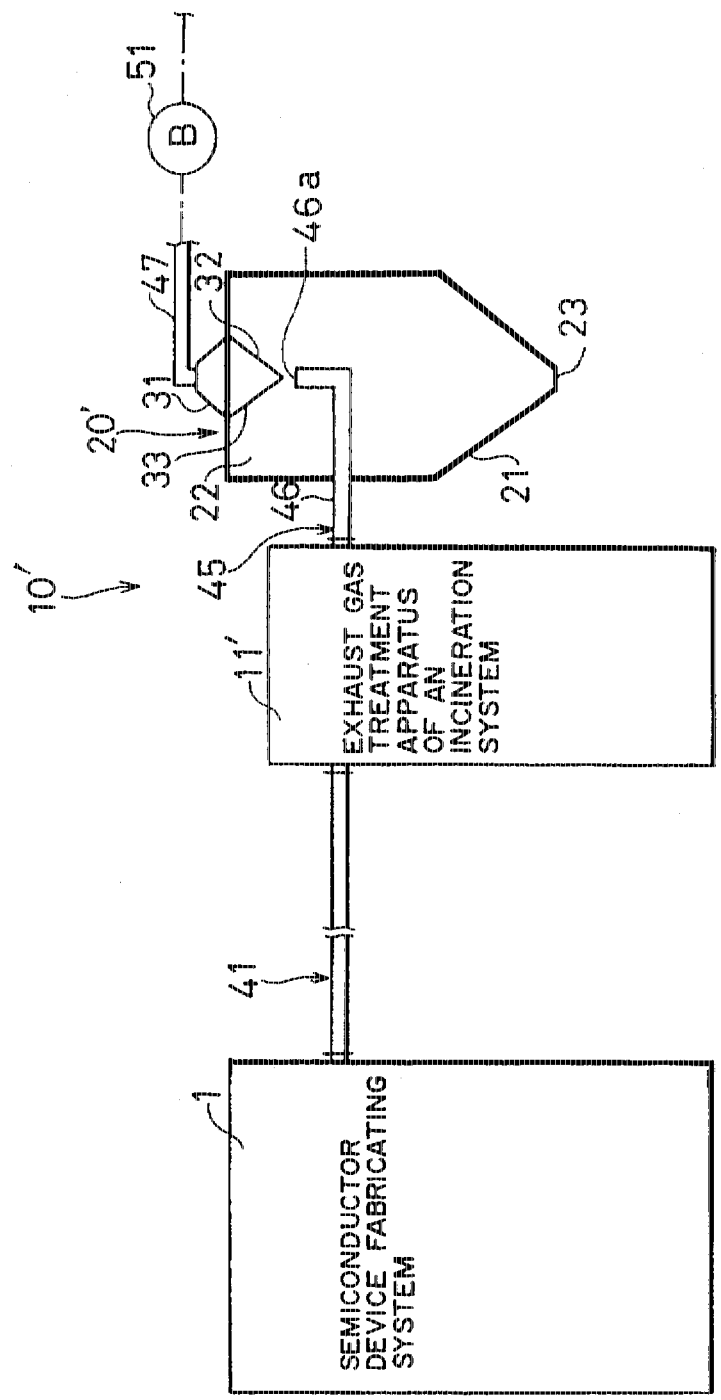
FIG. 6 is similarly a view for explaining a second embodiment.

An exhaust gas processing system 10' in a second embodiment according to the present invention will be described with reference to FIG. 6, in which parts like or corresponding to those of the exhaust gas processing system 10 shown in FIGS. 1 to 4 are designated by the same reference characters and the description thereof will be omitted to avoid duplication.

The exhaust gas processing system 10' has an exhaust gas treatment apparatus 11' of an incineration system connected to a semiconductor device fabricating system 1 by an exhaust gas discharge line 41, a particle separating apparatus 20' connected to the exhaust gas treatment apparatus 11' by a front gas pipe 46, and a suction device 51 connected to the particle separating apparatus 20' by a back gas pipe 47. Particles ($SiO_2$ particles) produced by the exhaust gas treatment apparatus 11' are removed by the particle separating apparatus 20'. The exhaust gas processing system 10' is provided with a particle container and a gas replacing apparatus, not shown, similar to the particle container 28 and the gas replacing apparatus 60 of the exhaust gas processing system 10P in the first embodiment.

More specifically, the particle separating apparatus 20' is disposed between the front gas pipe 46 forming a suction line 45, and the back gas pipe 47.

The particle separating apparatus 20' has a gas vessel 21 defining a gas chamber 22 for receiving a gas containing particles and discharged through one end portion 46a of the front gas pipe 46, a guide member 31 disposed in the gas chamber 22 and connected to the suction device 51 by the back gas pipe 47. The guide member 31 has bottom walls 32 and 33 forming guide surfaces and provided with openings 34. When the gas is blown through the end portion 46a of the front gas pipe 46 against the guide member 31, the guide surfaces of the bottom walls 32 and 33 deflect the gas so that the gas flows in vertical, whirling currents J1 and J2 in the gas chamber 22.

Particles, such as $SiO_2$ particles, produced by the exhaust gas treatment apparatus 11' of an incineration system can surely and efficiently be separated and removed from the gas by the particle separating apparatus 20' without the semiconductor device fabricating system 1 being stopped for an extended period of operation.

The exhaust gas processing systems in the first and the second embodiment may be provided with a plurality of particle separating apparatuses like the particle separating apparatus 20 for a further efficient particle separating operation.

Figure 7:
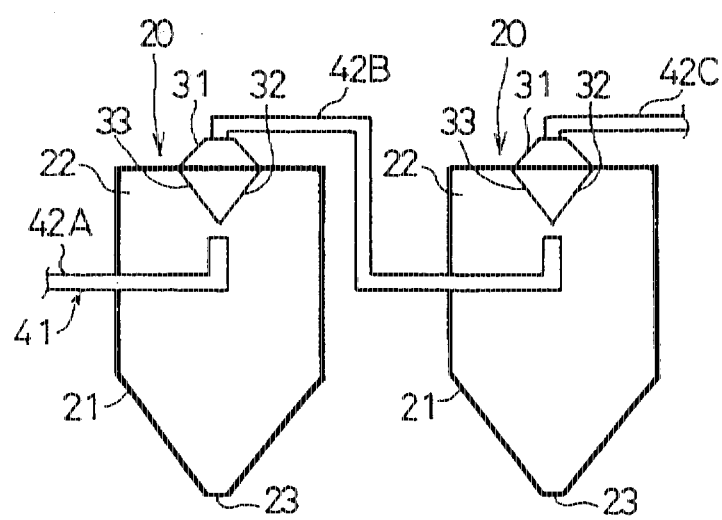
FIG. 7 is similarly a view of an arrangement of a plurality of particle separating apparatuses.

As shown in FIG. 7 by way of example, a gas discharge line 41 may be formed by a front exhaust pipe 42A, an intermediate exhaust pipe 42B and a back exhaust pipe 42C, and particle separating apparatuses 20 may be disposed between the front exhaust gas pipe 42A and the intermediate exhaust gas pipe 42B and between the intermediate exhaust gas pipe 42B and the back exhaust pipe 42C, respectively. Similarly, two particle separating apparatuses 20', for example, may be disposed on the gas discharge line 41.

Although the guide member 31 employed in the foregoing embodiments has the two bottom walls 32 and 33 forming the guide surfaces in a V-shape, the guide surfaces may be formed in any shape provided that the exhaust gas (the gas) blown through the end portion 42a (46a) of the exhaust pipe 42 (46) is caused to flow in whirling currents. For example, the guide member 31 may be provided with a single bottom wall forming a single guide surface, for example 32, to reduce the horizontal dimension of the gas vessel 21.

A guide member 31 having a conical guide surface 32 as shown in FIG. 8(A) or a guide member 31 having a pyramidal guide surface 32 as shown in FIG. 8(B) may be employed. It is also possible to employ a guide member 31 having a bottom wall 32 forming a horizontal guide surface, and to dispose the exhaust pipe 42 (46) with its end portion 42a (46a) extended obliquely to the horizontal guide surface of the guide member 31 as shown in FIG. 8(C) to generate whirling currents.

Although the invention has been described in its preferred form with a certain degree of particularity, obviously many changes and variations are possible therein. It is therefore to be understood that the present invention may be practiced otherwise than as specifically described herein without departing from the scope and spirit thereof.

What is claimed is:

1. In an exhaust gas processing system comprising means for treating an exhaust gas, means for supplying a particle-containing exhaust gas from a semiconductor device fabricating system to the exhaust gas treating means through an exhaust gas discharge line and means for inducing a negative pressure in the exhaust gas treating means to induce the flow of the particle-containing exhaust gas thereto, the improvement comprising said exhaust gas discharge line comprising a front exhaust pipe and a rear exhaust pipe and a particle separating apparatus for removing the particles from the particle-containing exhaust gas provided between said front and rear exhaust pipes, said particle separating apparatus comprising a gas vessel which defines a gas chamber for receiving the particle-containing exhaust gas from the front exhaust pipe and an exhaust gas guide member disposed in the gas chamber, said exhaust gas guide member having guide walls which define an internal space therein and are provided with openings through which the internal space communicates with the gas chamber, said front exhaust pipe introducing the particle-containing exhaust gas against outer surfaces of the guide walls such that the particle-containing exhaust gas flows in vertical, whirling currents in the gas chamber to effect separation of particles from the exhaust gas by centrifugal force.

2. The exhaust gas processing system of claim 1, wherein said particle separating apparatus additionally comprises a particle discharge unit provided at a lower portion of the particle separating apparatus and a particle container comprising a particle receiving unit detachably connected by a connecting pipe to the particle discharge unit, a valve is provided in the particle discharge unit and in the particle receiving unit and a gas replacing unit is provided in fluid communication with the connecting pipe and particle container for replacing a gas contained in the particle container with an inert gas before separating the particle container from the particle separating apparatus to dispose of the particles contained therein.

3. The exhaust gas processing system of claim 1, wherein said front exhaust pipe has a vertically-oriented end for introducing the particle-containing exhaust gas against the guide walls of the exhaust gas guide member.

4. The exhaust gas processing system of claim 3, wherein said guide walls meet at an apex and said particle-containing exhaust gas is directed against said apex.

5. The exhaust gas processing system of claim 1, wherein the internal space of the exhaust gas guide member is in fluid communication with the means for treating an exhaust gas through the rear exhaust pipe.

6. The exhaust gas processing system of claim 2, wherein a return pipe is provided between the front exhaust pipe and the particle container.

7. In an exhaust gas processing system comprising an incineration system for treating an exhaust gas, means for supplying a particle-containing exhaust gas from a semiconductor device fabricating system to the incineration system through an exhaust gas discharge line and means for inducing a negative pressure in the incineration system to induce the flow of the particle-containing exhaust gas thereto, the improvement comprising said exhaust gas discharge line comprising a front exhaust pipe and a rear exhaust pipe and a particle separating apparatus for removing the particles from the particle-containing exhaust gas provided between said front and rear exhaust pipes, said particle separating apparatus comprising a gas vessel which defines a gas chamber for receiving the particle-containing exhaust gas from the front exhaust pipe and an exhaust gas guide member disposed in the gas chamber, said exhaust gas guide member having guide walls which define an internal space therein and are provided with openings through which the internal space communicates with the gas chamber, said front exhaust pipe introducing the particle-containing exhaust gas against outer surfaces of the guide walls such that the particle-containing exhaust gas flows in vertical, whirling currents in the gas chamber to effect separation of particles from the exhaust gas by centrifugal force.

8. The exhaust gas processing system of claim 7, wherein said particle separating apparatus additionally comprises a particle discharge unit provided at a lower portion of the particle separating apparatus and a particle container comprising a particle receiving unit detachably connected by a connecting pipe to the particle discharge unit, a valve provided in the particle discharge unit and in the particle receiving unit and a gas replacing unit provided in fluid communication with the connecting pipe and particle container for replacing a gas contained in the particle container with an inert gas before separating the particle container from the particle separating apparatus to dispose of the particles contained therein.

9. The exhaust gas processing system of claim 7, wherein said front exhaust pipe has a vertically-oriented end for introducing the particle-containing exhaust gas against the guide walls of the exhaust gas guide member.

10. The exhaust gas processing system of claim 9, wherein said guide walls meet at an apex and said particle-containing exhaust gas is directed against said apex.

11. The exhaust gas processing system of claim 7, wherein the internal space of the exhaust gas guide member is in fluid communication with the means for treating an exhaust gas through the rear exhaust pipe.

12. The exhaust gas processing system of claim 8, wherein a return pipe is provided between the front exhaust pipe and the particle container.

13. In an exhaust gas processing system comprising means for treating an exhaust gas, means for supplying an exhaust gas from a semiconductor device fabricating system to the exhaust gas treating means and means for inducing a negative pressure in the exhaust gas treating means to induce the flow of the exhaust gas thereto, the improvement comprising means for feeding a particle-containing gas to a particle separating apparatus provided downstream of the semiconductor device fabricating system and a particle separating apparatus for receiving and removing the particles from the particle-containing gas, said particle separating apparatus comprising a gas vessel which defines a gas chamber for receiving the particle-containing gas and an exhaust gas guide member disposed in the gas chamber, said exhaust gas guide member having guide walls which meet at an apex, define an internal space therein and are provided with openings through which the internal space communicates with the gas chamber, the means for feeding a particle-containing gas comprising a front exhaust pipe having a vertically oriented end for introducing the particle-containing gas against an outer surface of the apex to cause the particle-containing gas to flow in vertical, whirling currents in the gas chamber to effect separation of particles from the exhaust gas by centrifugal force.

14. The exhaust gas processing system of claim 13, wherein said particle separating apparatus additionally comprises a particle discharge unit provided at a lower portion of the particle separating apparatus and a particle container comprising a particle receiving unit detachably connected by a connecting pipe to the particle discharge unit, a valve provided in the particle discharge unit and in the particle receiving unit and a gas replacing unit provided in fluid communication with the connecting pipe and particle container for replacing a gas contained in the particle container with an inert gas before separating the particle container from the particle separating apparatus to dispose of the particles contained therein.

15. The exhaust gas processing system of claim 13, wherein the internal space of the exhaust gas guide member is in fluid communication with the means for inducing a negative pressure.

* * * * *